(12) United States Patent
Wilson et al.

(10) Patent No.: US 10,623,200 B2
(45) Date of Patent: Apr. 14, 2020

(54) BUS-INVERT CODING WITH RESTRICTED HAMMING DISTANCE FOR MULTI-BYTE INTERFACES

(71) Applicant: NVIDIA Corp., Santa Clara, CA (US)

(72) Inventors: John Wilson, Wake Forest, NC (US); Sunil Sudhakaran, Brisbane, CA (US)

(73) Assignee: NVIDIA Corp., Santa Clara, CA (US)

( * ) Notice: Subject to any disclaimer, the term of this patent is extended or adjusted under 35 U.S.C. 154(b) by 0 days.

(21) Appl. No.: 16/190,467

(22) Filed: Nov. 14, 2018

(65) Prior Publication Data

US 2020/0028708 A1 Jan. 23, 2020

Related U.S. Application Data

(60) Provisional application No. 62/701,075, filed on Jul. 20, 2018.

(51) Int. Cl.
*H04L 12/40* (2006.01)
*G06F 13/40* (2006.01)

(52) U.S. Cl.
CPC .... *H04L 12/40032* (2013.01); *G06F 13/4027* (2013.01)

(58) Field of Classification Search
CPC .......... Y02D 10/151; H04L 2001/0096; H04L 25/4925; H04L 25/4906; H04L 25/4908; G06F 1/3253; G06F 9/30156; G06F 11/10; G06F 13/4282; G06F 21/85; G06F 13/40; G06F 13/4221; G06F 13/4234; G06F 13/4286; H03M 13/19; G01R 31/31703
See application file for complete search history.

(56) References Cited

U.S. PATENT DOCUMENTS

| | | | |
|---|---|---|---|
| 4,739,323 A | 4/1988 | Miesterfeld et al. | |
| 4,742,349 A | 5/1988 | Miesterfeld et al. | |
| 5,377,020 A | 12/1994 | Smitt | |
| 5,572,736 A * | 11/1996 | Curran | G06F 13/4072 |
| | | | 713/320 |
| 6,285,300 B1 | 9/2001 | Colon-Bonet | |
| 6,604,120 B1 | 8/2003 | De | |
| 7,149,955 B1 | 12/2006 | Sutardja et al. | |
| 7,188,263 B1 | 3/2007 | Rubinstein et al. | |
| 7,620,116 B2 | 11/2009 | Bessios et al. | |
| 8,022,726 B2 | 9/2011 | Candage et al. | |
| 8,181,101 B2 * | 5/2012 | Shen | G06F 11/10 |
| | | | 714/800 |

(Continued)

FOREIGN PATENT DOCUMENTS

| | | |
|---|---|---|
| DE | 102019108205 A1 | 10/2019 |
| DE | 102019118340 A1 | 1/2020 |

OTHER PUBLICATIONS

U.S. Appl. No. 16/557,637, filed Aug. 30, 2019, Sunil Sudhakaran.

(Continued)

*Primary Examiner* — Rahel Guarino
(74) *Attorney, Agent, or Firm* — Rowan TELS LLC

(57) ABSTRACT

An encoding process for bus data utilizes data from multiple data line groups on a multi-byte wide bus where each group has an associated DBI line. The process leverages the expanded encoding space for the multiple groups and associated multiple DBI bits. This process may be expanded to four bytes, eight bytes, etc.

11 Claims, 9 Drawing Sheets

(56) References Cited

U.S. PATENT DOCUMENTS

| | | |
|---|---|---|
| 8,359,498 B1 | 1/2013 | Sutardja et al. |
| 8,984,380 B2 | 3/2015 | Vijayaraghavan et al. |
| 9,184,906 B1 | 11/2015 | Min et al. |
| 9,231,704 B1 | 1/2016 | Zhou et al. |
| 9,240,907 B2 | 1/2016 | Wang |
| 9,244,763 B1 | 1/2016 | Kankani et al. |
| 9,548,858 B1 | 1/2017 | Cirit et al. |
| 9,564,990 B1 | 2/2017 | Tiruvur et al. |
| 9,853,769 B1 | 12/2017 | Farjad et al. |
| 9,942,063 B2 | 4/2018 | Mendel |
| 10,312,896 B2 | 6/2019 | Kim et al. |
| 2003/0035497 A1 | 2/2003 | Gorecki et al. |
| 2003/0108134 A1 | 6/2003 | Stonick et al. |
| 2004/0114692 A1 | 6/2004 | Matsumoto |
| 2005/0086417 A1 | 4/2005 | Meyer et al. |
| 2005/0089126 A1 | 4/2005 | Zerbe et al. |
| 2006/0109917 A1 | 5/2006 | Fonseka et al. |
| 2006/0139186 A1 | 6/2006 | Hoyer |
| 2006/0280272 A1 | 12/2006 | Stojanovic |
| 2007/0203962 A1 | 8/2007 | Hirairi |
| 2008/0181331 A1 | 7/2008 | Casper et al. |
| 2008/0262855 A1 | 10/2008 | Mehrotra et al. |
| 2009/0193319 A1 | 7/2009 | Shen et al. |
| 2009/0323722 A1 | 12/2009 | Sharma |
| 2010/0174844 A1 | 7/2010 | Chu |
| 2010/0299440 A1 | 11/2010 | Meyer et al. |
| 2011/0264719 A1 | 10/2011 | Mortensen |
| 2012/0110255 A1 | 5/2012 | Meyer et al. |
| 2012/0144161 A1 | 6/2012 | Elliott |
| 2012/0204082 A1 | 8/2012 | Shen et al. |
| 2012/0206280 A1 | 8/2012 | Abbasfar et al. |
| 2012/0250746 A1 | 10/2012 | Sonntag |
| 2013/0226982 A1 | 8/2013 | Yu |
| 2014/0153620 A1 | 6/2014 | Longo et al. |
| 2014/0173296 A1 | 6/2014 | Muff et al. |
| 2014/0281075 A1 | 9/2014 | Hollis |
| 2014/0298458 A1 | 10/2014 | Lewis et al. |
| 2014/0358979 A1 | 12/2014 | Singh |
| 2015/0137789 A1 | 5/2015 | Furtner |
| 2015/0235634 A1 | 8/2015 | Liu et al. |
| 2016/0013958 A1 | 1/2016 | Mishra et al. |
| 2016/0164705 A1 | 6/2016 | Whitby-Strevens |
| 2016/0173134 A1 | 6/2016 | Kwon et al. |
| 2016/0373557 A1 | 12/2016 | Sikkink et al. |
| 2017/0075854 A1 | 3/2017 | Hollis |
| 2017/0207908 A1 | 7/2017 | Cirit et al. |
| 2017/0220518 A1 | 8/2017 | Sengoku et al. |
| 2017/0310529 A1 | 10/2017 | Yang et al. |
| 2017/0373887 A1 | 12/2017 | Ho |
| 2018/0091189 A1 | 3/2018 | Chada et al. |
| 2018/0091335 A1 | 3/2018 | Schnizler |
| 2019/0199560 A1 | 6/2019 | Bossard et al. |
| 2019/0303340 A1 | 10/2019 | Lee et al. |
| 2019/0305995 A1 | 10/2019 | Lee et al. |

OTHER PUBLICATIONS

AN 835 PAM4 Signaling Fundamentals by INTEL 03122019.
Hossain et al, Channel-Adaptive ADC and TDC for 28 Gb/s PAM-4 Digital Receiver.
Im et al, A 40-to-56 Gb/s PAM-4 Receiver With Ten-Tap Direct Decision-Feedback Equalization in 16-nm FinFET.
Khandelwal et al. DesignCon 2016 Year 2016.
Low Power Bus Transform Coding for Multi Level Signals 2006 Zaman.
P. S. Teja, "Design of Radix-8 Booth Multiplier Using Koggestone Adder for High Speed Arithmetic Applications," Emerging Trends in Electrical, Electronics & Instrumentation Engineering: An international Journal (EEIEJ), vol. 1, No. 1, Feb. 2014 (Year: 2014).
Pupalaikis et al, Designcon 2017, Inphi, 2017, (Year: 2017).
S. Samavi, "High Radix Multipliers," Jan. 2014, retrieved from https://www.researchgate.net/publication/262836009 (Year: 2014).
Space Coding Applied to High Speed Chip FARZAN 2004.
Zhang et al, PAM4 Signalling for 56G Serial Link Applications—A Tutorial (Year: 2016).

\* cited by examiner

BUS-INVERT CODING WITH RESTRICTED HAMMING DISTANCE FOR MULTI-BYTE INTERFACES

CROSS-REFERENCE TO RELATED APPLICATIONS

This application claims benefit under 35 U.S.C. 119 to U.S. application Ser. No. 62/701,075, entitled "BUS-INVERT CODING WITH RESTRICTED HAMMING DISTANCE FOR MULTI-BYTE INTERFACES", filed on Jul. 20, 2018, and incorporated herein by reference in its entirety.

BACKGROUND

Conventional bus-invert coding inverts the polarity of all the data bits (and the added wire/bit called the DBI bit) when more than half the number of bits (including the DBI bit) switch polarity on the next parallel data transmission on the bus. This avoids adjacent data transitions in which more than one half of the bits change polarity. For example, using conventional DBI, on an 8-bit data bus with one DBI line, the total number of lines undergoing a change of polarity between byte transmissions is between 0 and 4, which reduces simultaneous switching output (SSO) noise by 50%.

BRIEF SUMMARY

Described herein are techniques to reduce the noise induced on a power supply from several bus drivers simultaneously switching their outputs (SSO noise). The techniques work with the existing encoding/decoding mechanisms currently used in high-bandwidth memory (HBM) that utilize multiple bytes in the decision algorithm. This enables a substantial reduction in the induced power supply noise while remaining backward compatible with existing bus communication mechanisms. The technique may also be applied to on-chip buses such as buses used to communicate data between functional units on a graphics processing unit (GPU), between a general purpose central processing unit (CPU) and other circuits, or generally between an two circuit components that communicate over a bus.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Techniques are disclosed to utilize data from multiple byte transmissions on a multi-byte wide bus where each byte has an associated DBI line. The technique leverages the expanded encoding space for the multi-byte data and associated multiple DBI bits. This enables the maximum number of polarity changes on the bus for a 16-bit data transmission (+2 DBI bits), which reduces SSO noise by 75%. This technique can be expanded to four bytes for a 32-bit data transmission (+4 DBI bits), which reduces SSO noise by 87.5%.

The techniques disclosed herein determine the Hamming Distance across multiple bytes to further restrict the total data line transitions beyond what could be achieved by considering each byte of the bus independently. For each doubling of the number of bytes considered, and the associated DBI bits, the aggregate Hamming Distance may be reduced by an incremental 50%, relative to using no encoding. Therefore, the SSO noise is reduced by an additional incremental 50% each time the bus width doubles. As the bus width expands, the SSO noise utilizing the disclosed techniques approaches zero. Furthermore, this encoding technique may be effective in defeating systems that analyze power supply fluctuations/variations to determine/decrypt encrypted information.

Figure 1:
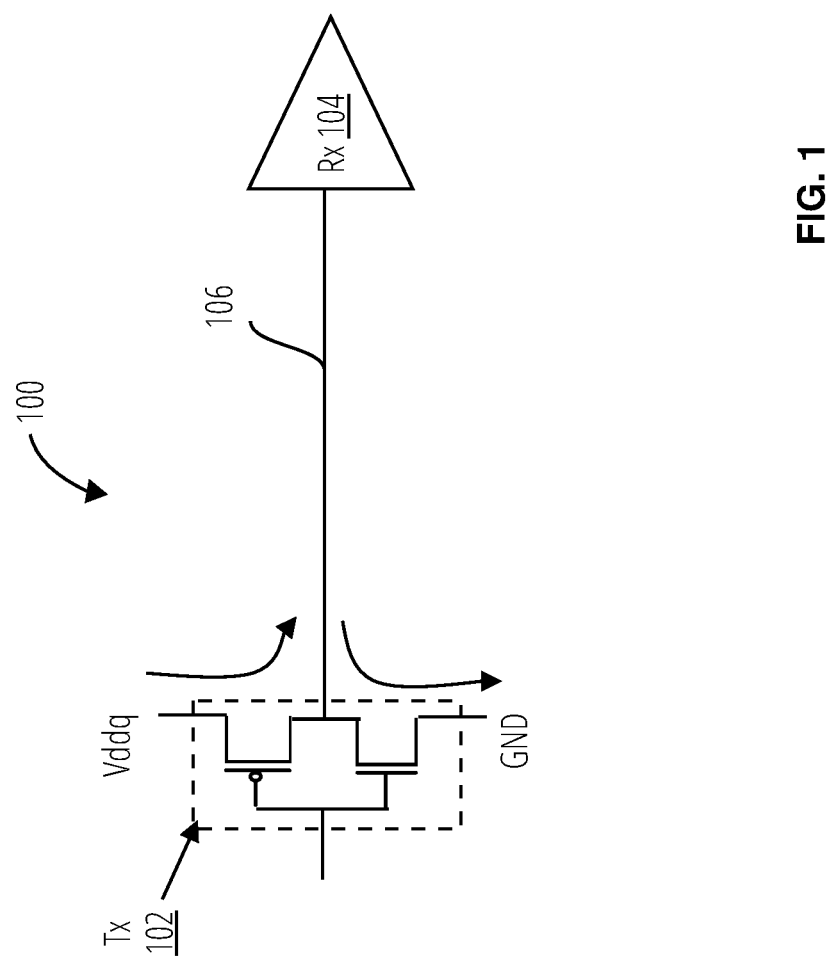
FIG. 1 illustrates an embodiment of an unterminated bus line 100.

FIG. 1 illustrates an example of an unterminated bus line 100. For simplicity, the transmitter 102 (Tx) is illustrated as an inverter designed to have an output impedance that can drive the load, represented by the capacitance of the data line 106 and the receiver 104, with appropriate rise and fall times for the operating rate. When the transmitter 102 transitions the data line 106 from logic LO to logic HI, there is an impulse of current drawn from the $V_{DDQ}$ power supply. When the transmitter 102 transitions the data line 106 from logic HI to logic LO, there is an impulse of current sunk into GND. This push and pull of current on the data line 106 is a source of SSO noise on buses that utilize multiple data lines.

Figure 2:
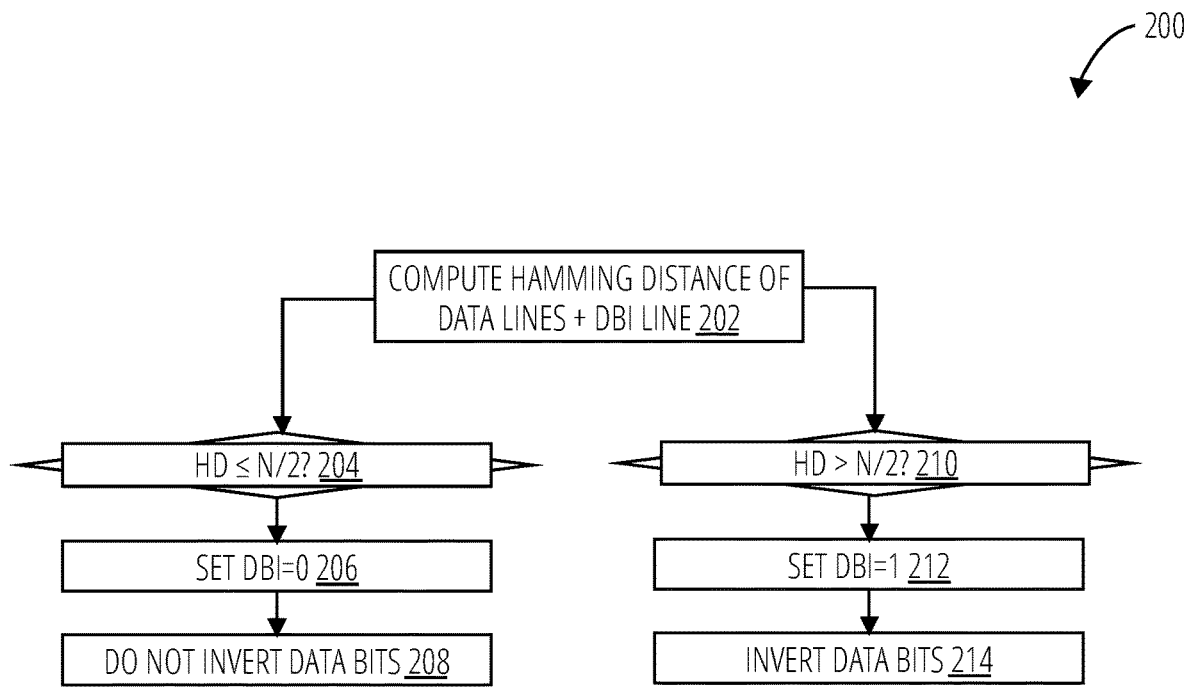
FIG. 2 illustrates an embodiment of a conventional DBI technique 200.

FIG. 2 illustrates a conventional DBI technique 200. The Hamming Distance (HD) for the data and the DBI line setting for a next bus cycle as compared to the previous bus cycle is determined (block 202). If the HD is less than or equal to half the number of data lines N (decision block 204), the DBI line is set to zero (block 206) and the data bits are not inverted (block 208). The HD is greater than N/2 (decision block 210), then DBI is set to 1 (block 212) and the data bits are inverted (block 214).

Figure 3:
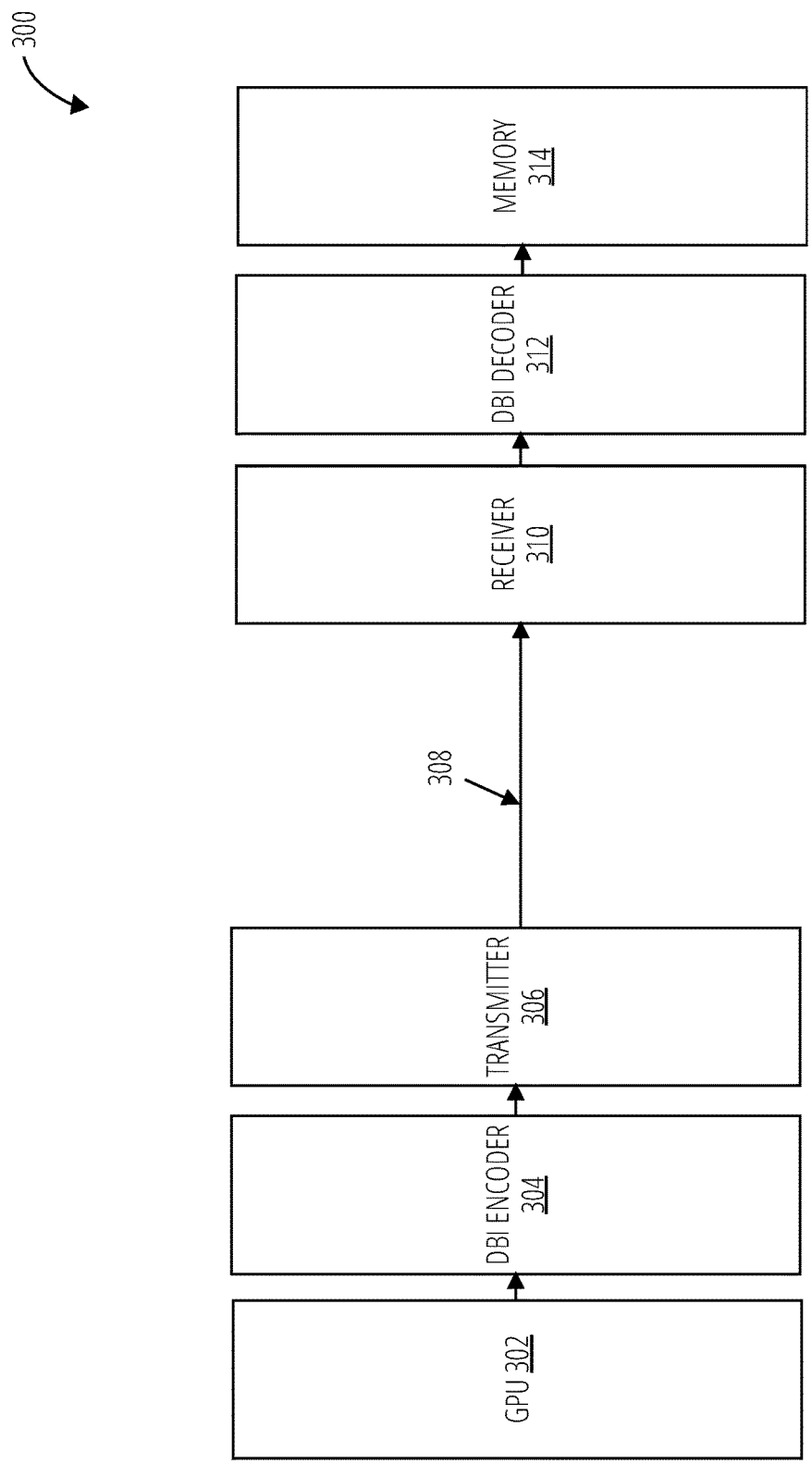
FIG. 3 illustrates an embodiment of a data communication system 300.

FIG. 3 illustrates a data communication system 300 in one embodiment. The data communication system 300 comprises a GPU 302, a DBI encoder 304, a transmitter 306, a receiver 310, a DBI decoder 312, and a memory 314. The GPU 302 generates data, e.g., results of computations, to store in the memory 314. The data output from the GPU 302 is received at the DBI encoder 304 and encoded in the manner described herein, including the addition of multiple DBI bits to the data. The DBI encoder 304 outputs the encoded data to the transmitter 306, which generates the voltage signaling on the data and DBI lines of the bus 308 to the receiver 310. The receiver 310 receives the signals from the data and DBI lines and provides the signals to the DBI decoder 312, which decodes the data. No changes are required for a conventional DBI decoder when using the described encoding techniques. The decoded data is then stored in the memory 314. The techniques disclosed herein are useful for reducing SSO in systems such as the data communication system 300.

Figure 4:
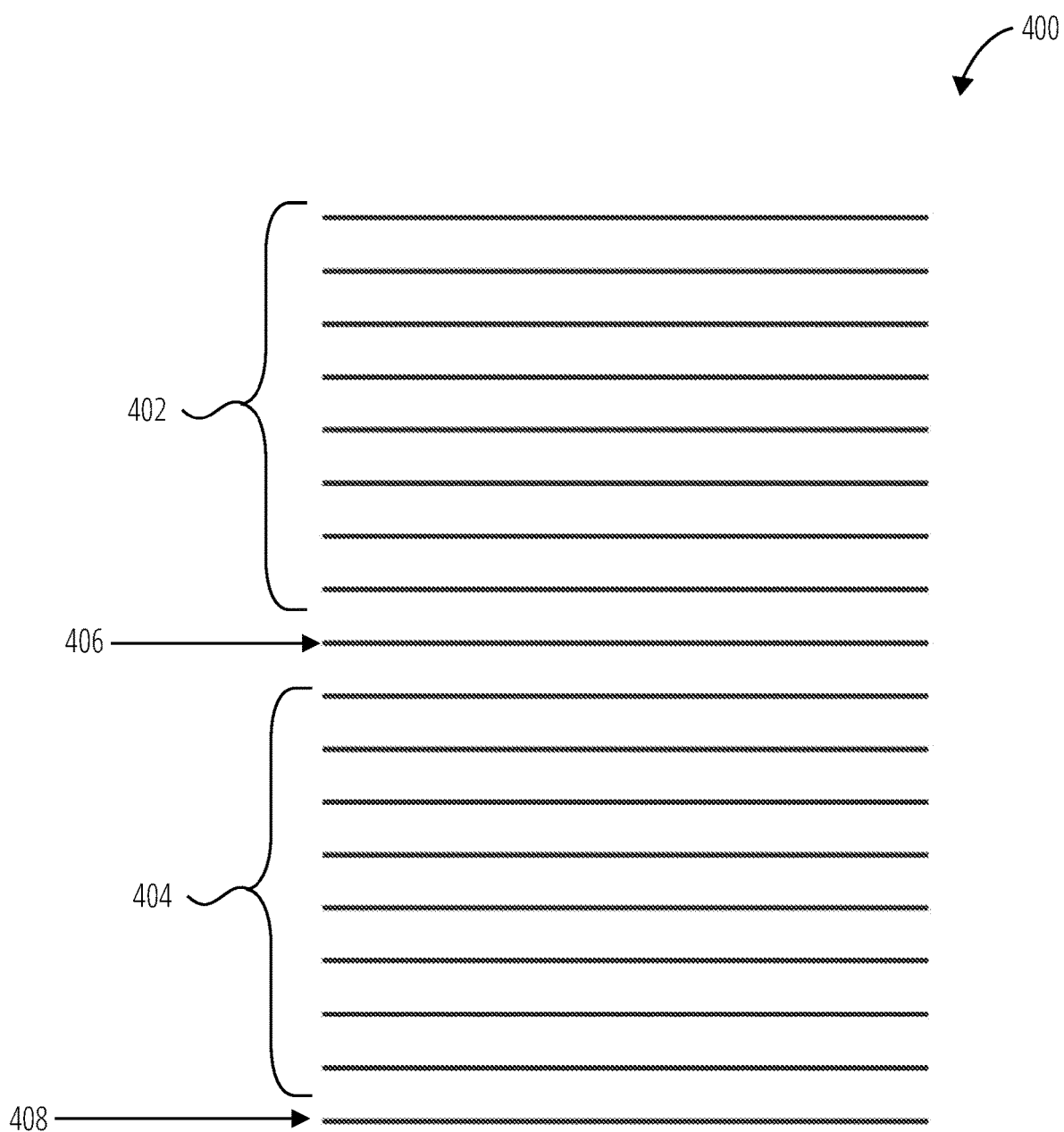
FIG. 4 illustrates an embodiment of a 16-bit data bus 400.

FIG. 4 illustrates an embodiment of a 16-bit data bus 400. The 16-bit data bus 400 comprises two groups of data lines (group 1 402, group 2 404) each having 8 data lines. The data lines in group 1 402 have an associated DBI line (DBI1 406) and the data lines in group 2 have an associated DBI line (DBI2 408). The layout of data lines and DBI lines in the 16-bit data bus 400 may vary in other implementations. During each bus cycle, data bits are transmitted along the data lines (e.g., one bit per line) as described above and a data inversion bit is transmitted by the associated DBI line. Each of the data bits may have a value of "0" or "1" during each bus cycle. The Hamming Distance for each line is "1" for a change in value (i.e., "0" to "1" or "1" to "0") or "0" for no change in value (i.e., "0" to "0" or "1" to "1"). The Hamming Distance for each line is then aggregated for each group. In some embodiments, the Hamming Distance for a group may be between 0 and 8, although it could also be larger than 8.

Figure 5:
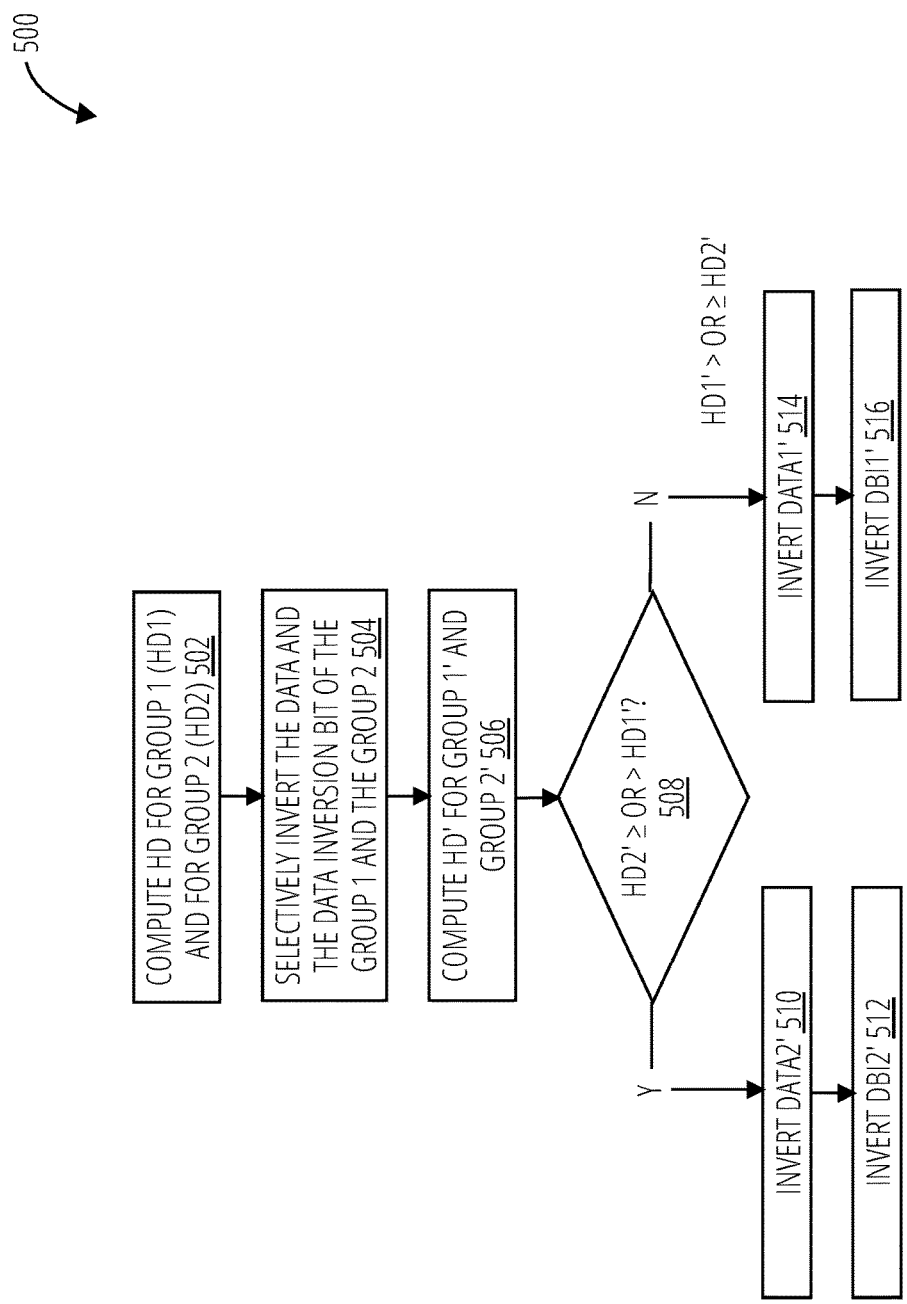
FIG. 5 illustrates an embodiment of a 2-byte DBI encoding technique 500.

FIG. 5 illustrates a 2-byte DBI encoding technique 500 in accordance with one embodiment. At block 502, the Hamming Distance is computed for two groups (group 1 and group 2) of data lines and their associated DBI lines DBI1 and DBI2 respectively. The Hamming Distance for group 1 is denoted HD1, and the Hamming Distance for group 2 is denoted HD2. At block 504, the data and the data inversion bit of the group 1 and the group 2 are selectively inverted. The selective inversion may be based on the conventional DBI technique 200 depicted in FIG. 2. At block 506, a second Hamming Distance (or encoded Hamming Distance), HD1' and HD2', is computed for each group, group 1' and group 2', respectively. The second Hamming Distance, HD1' and HD2', is computed for the data selectively inverted in block 504, that is the data for group 1' and group 2', Data1' and Data2'. At decision block 508, the 2-byte DBI encoding technique 500 determines whether HD2'≥HD1'. In another embodiment, the 2-byte DBI encoding technique 500 determines whether HD2'>HD1'. If so, at block 510 and block 512, the data for group 2' is inverted and DBI2' is inverted. In a first embodiment, at block 514 and block 516, if HD1'>HD2', the data for group 1' is inverted and DBI1' is inverted. In a second embodiment, if HD1'≥HD2', the data for group 1' is inverted and DBI1' is inverted.

Figure 6:
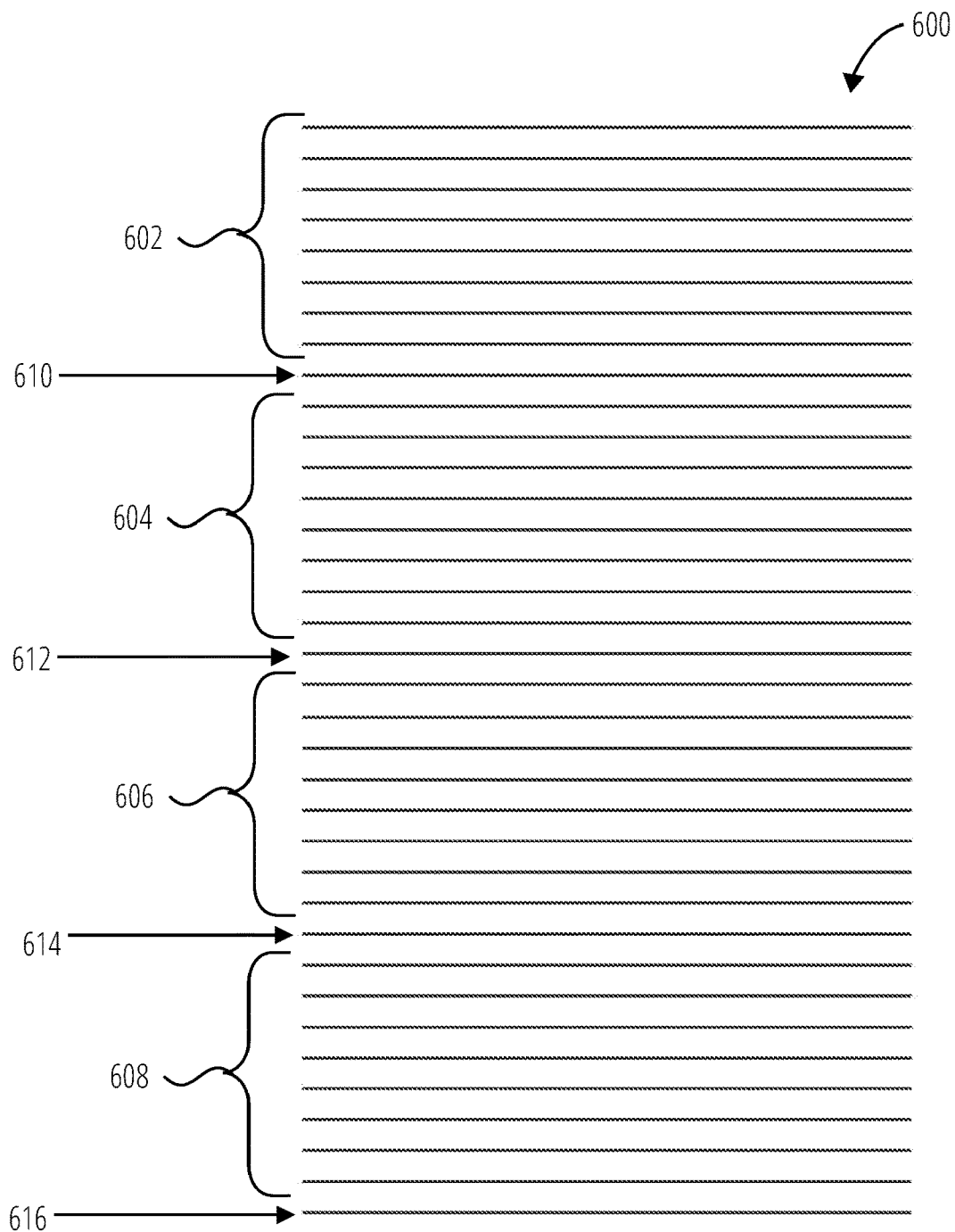
FIG. 6 illustrates an embodiment of a 32-bit data bus 600.

FIG. 6 illustrates an embodiment of a 32-bit data bus 600. The 32-bit data bus 600 comprises four groups of data lines: group 1 602, group 2 604, group 3 606, and group 4 608. Each group has an associated DBI line: respectively for group 1 602-group 4 608, DBI1 610, DBI2 612, DBI3 614, and DBI4 616. The layout of data lines and DBI lines in the 32-bit data bus 600 may vary in other implementations. As depicted, group 1 602 is adjacent to group 2 604, while group 3 606 is adjacent to group 4 608. In other embodiments, the lines may be arranged differently. Furthermore, the physical location of the lines may be utilized to determine the group to which each line is assigned. In yet further embodiments, each group may comprise adjacent lines, while the group number, which may determine that other group for inversion, is based on the physical location of the group. For example, adjacent groups may be selected for encoding (depicted in FIG. 5). Other embodiments may select non-adjacent groups for encoding.

Figure 7:
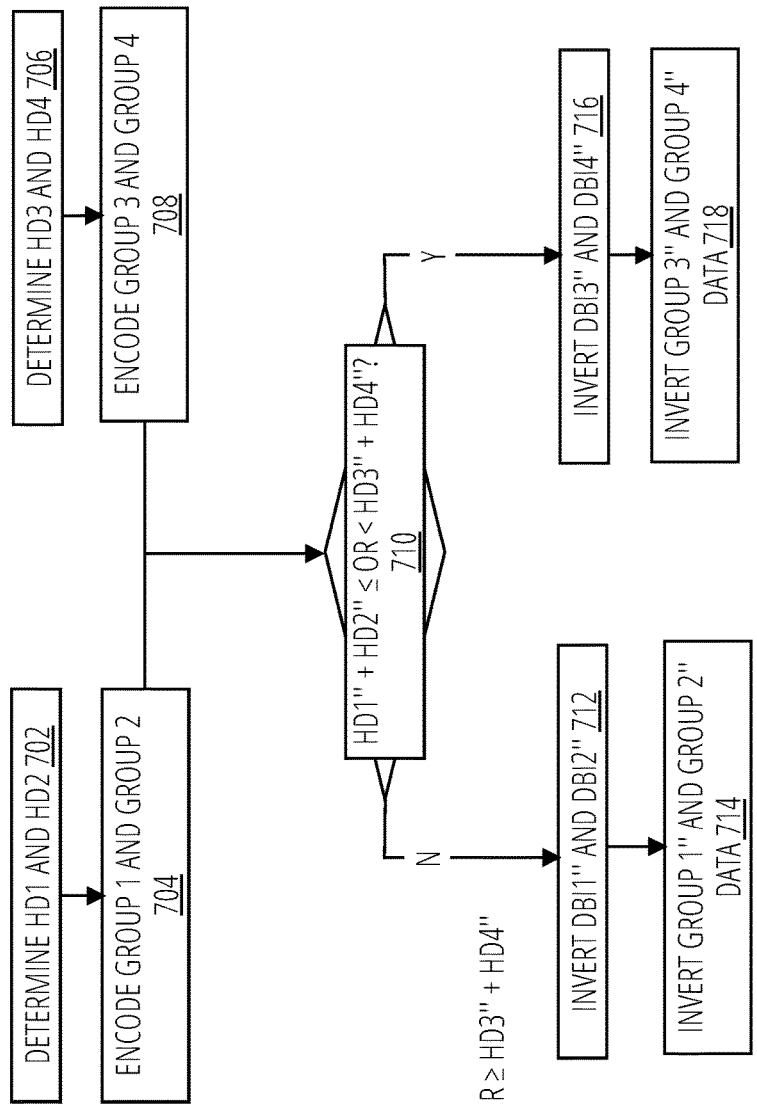
FIG. 7 illustrates an embodiment of a 4-byte DBI encoding technique 700.

FIG. 7 illustrates a 4-byte DBI encoding technique 700 in accordance with one embodiment. The 4-byte DBI encoding technique 700 extends the 2-byte DBI encoding technique 500 to encode across four bytes of bus data (e.g., for a 32-bit data bus 600 with DBI lines as illustrated in FIG. 6). This encoding is achieved by treating the four bytes as a pair of byte-pairs. That is, the first pair of bytes (e.g., group 1 602 and group 2 604) are evaluated and encoded as a unit (block 702 and block 704), and the second pair of bytes (e.g., group 3 606 and group 4 608) are evaluated and encoded as another unit (block 706 and block 708). Then, the combined Hamming Distance of the two byte-pairs are compared (decision block 710), and additional encoding operations are applied to one, or the other, byte-pair. This simplifies the overall encoding of the four bytes since each pair of bytes can utilize the same logic that is needed for the previous encoding of the 2-byte DBI encoding technique 500.

The first stage of the 4-byte DBI encoding technique 700 (block 702, block 704, block 706, and block 708) applies two encoders (see 2-byte DBI encoding technique 500), one to the raw byte pair of group 1/group 2 (and their associated DBI lines), and another to the raw byte pair of group 3/group 4 (and their associated DBI lines).

The second stage of the 4-byte DBI encoding technique 700 (decision block 710) applies the output from two encoders and compares the combined Hamming Distance (HD1"+HD2", respectively, where HDn" is the Hamming Distance of group 1/group 2 after the encoding of FIG. 5) for the group 1/group 2 pair with the combined Hamming Distance (HD3"+HD4", respectively, where HDn" is the Hamming Distance of group 3/group 4 after the encoding of FIG. 5) for the group 3/group 4 pair.

The third stage of the 4-byte DBI encoding technique 700 applies an encoding algorithm as follows:
1. If HD1"+HD2"≤HD3"+HD4", then invert DBI3" and DBI4" (block 716) and invert group 3" and group 4" bits (block 718); and
2. If HD1"+HD2">HD3"+HD4", then invert DBI1" and DBI2" (block 712) and invert group 1" and group 2" bits (block 714).

In another embodiment, the third stage of the 4-byte DBI encoding technique 700 applies an encoding algorithm as follows:
3. If HD1"+HD2"<HD3"+HD4", then invert DBI3" and DBI4" (block 716) and invert group 3" and group 4" bits (block 718); and
4. If HD1"+HD2"≥HD3"+HD4", then invert DBI1" and DBI2" (block 712) and invert group 1" and group 2" bits (block 714).

In other words, the 4-byte DBI encoding technique 700 determines which encoded byte-pair (and associated DBI bits) has the largest combined Hamming Distance, then inverts that byte-pair and the associated DBI bits. If the byte-pairs have the same combined Hamming Distance, then the 4-byte DBI encoding technique 700 may invert either byte-pair (i.e., one and only one byte-pair) and the associated DBI bits based on the embodiment.

Figure 8:
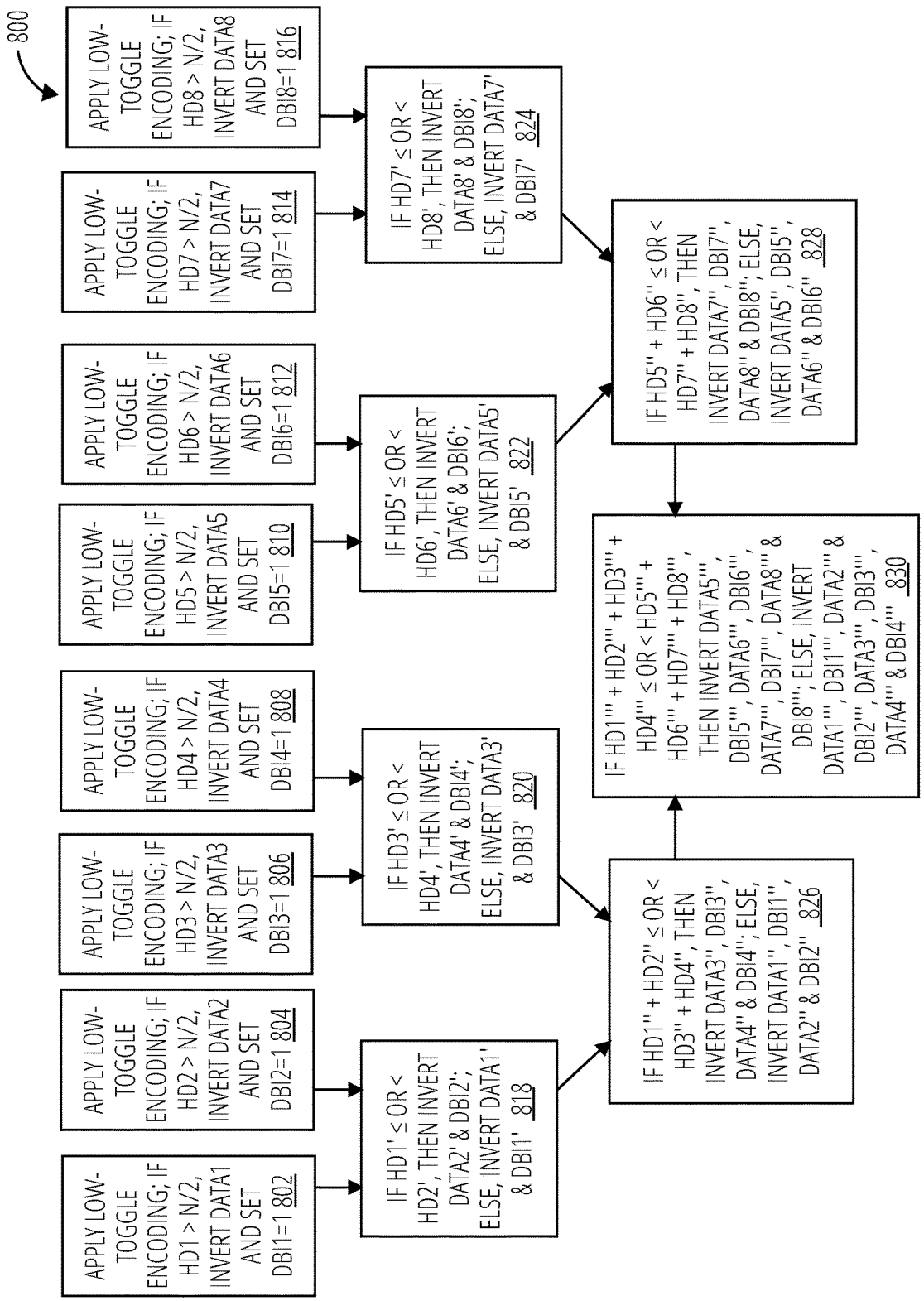
FIG. 8 illustrates an 8-byte DBI encoding technique 800 in accordance with one embodiment.

FIG. 8 illustrates an 8-byte DBI encoding technique 800 in accordance with one embodiment. In a first stage (block 802, block 804, block 806, block 808, block 810, block 812, block 814, and block 816), low-toggle encoding is applied to each group. For example, if HDn>N/2, invert Datan and set DBIn=1. The first stage may utilize the conventional DBI technique 200 depicted in FIG. 2.

During the second stage (block 818, block 820, block 822, and block 824), the bytes are paired (e.g., group 1/group 2, group 3/group 4, group 5/group 6, and group 7/group 8). These byte pairs have their encoded Hamming Distance compared and one group from the byte pair has the data bits and data inversion bit inverted. The second stage may utilize the 2-byte DBI encoding technique 500 depicted in FIG. 5.

During the third stage (block 826 and block 828), the byte pair is further paired with another byte pair. Each byte pair has a combined Hamming Distance computed. The combined Hamming Distance is then compared, and one byte pair has the data bits and the data inversion bit inverted. The third stage may utilize the 4-byte DBI encoding technique 700 depicted in FIG. 7.

During the fourth stage (block 830), a second combined Hamming Distance is determined for the pairs of byte pairs that were compared during the third stage. As depicted in FIG. 8, groups 1-4 and groups 5-8 have a combined Hamming Distance determined utilizing the data bits and data inversion bit that has been subject to the inversion encoding of the previous stages. The second combined Hamming Distance is then compared and one group of four bytes has their data bits and the data inversion bit inverted. The fourth stage of the 8-byte DBI encoding technique 800 applies the previous stages as follows:

5. If $HD1'''+HD2'''+HD3'''+HD4''' \leq HD5'''+HD6'''+HD7'''+HD8'''$, then invert Data5''', DBI5''', Data6''', DBI6''', Data7''', DBI7''', Data8''' & DBI8'''
6. If $HD1'''+HD2'''+HD3'''+HD4''' > HD5'''+HD6'''+HD7'''+HD8'''$, then invert Data1''', DBI1''', Data2''', DBI2''', Data3''', DBI3''', Data4''' & DBI4'''.

In another embodiment, the fourth stage of the 8-byte DBI encoding technique 800 applies an encoding algorithm as follows:

7. If $HD1'''+HD2'''+HD3'''+HD4''' < HD5'''+HD6'''+HD7'''+HD8'''$, then invert Data5''', DBI5''', Data6''', DBI6''', Data7''', DBI7''', Data8''' & DBI8''' and
8. If $HD1'''+HD2'''+HD3'''+HD4''' \geq HD5'''+HD6'''+HD7'''+HD8'''$, then invert Data1''', DBI1''', Data2''', DBI2''', Data3''', DBI3''', Data4''' & DBI4'''.

In other words, the 8-byte DBI encoding technique 800 determines which encoded pair of byte-pairs (and associated DBI bits) has the largest combined Hamming Distance, then inverts that pair of byte-pairs and the associated DBI bits. If each of the pair of byte-pairs have the same combined Hamming Distance, then the 8-byte DBI encoding technique 800 may invert either pair of byte-pairs (i.e., one and only one pair of byte-pairs) and the associated DBI bits based on the embodiment.

Figure 9:
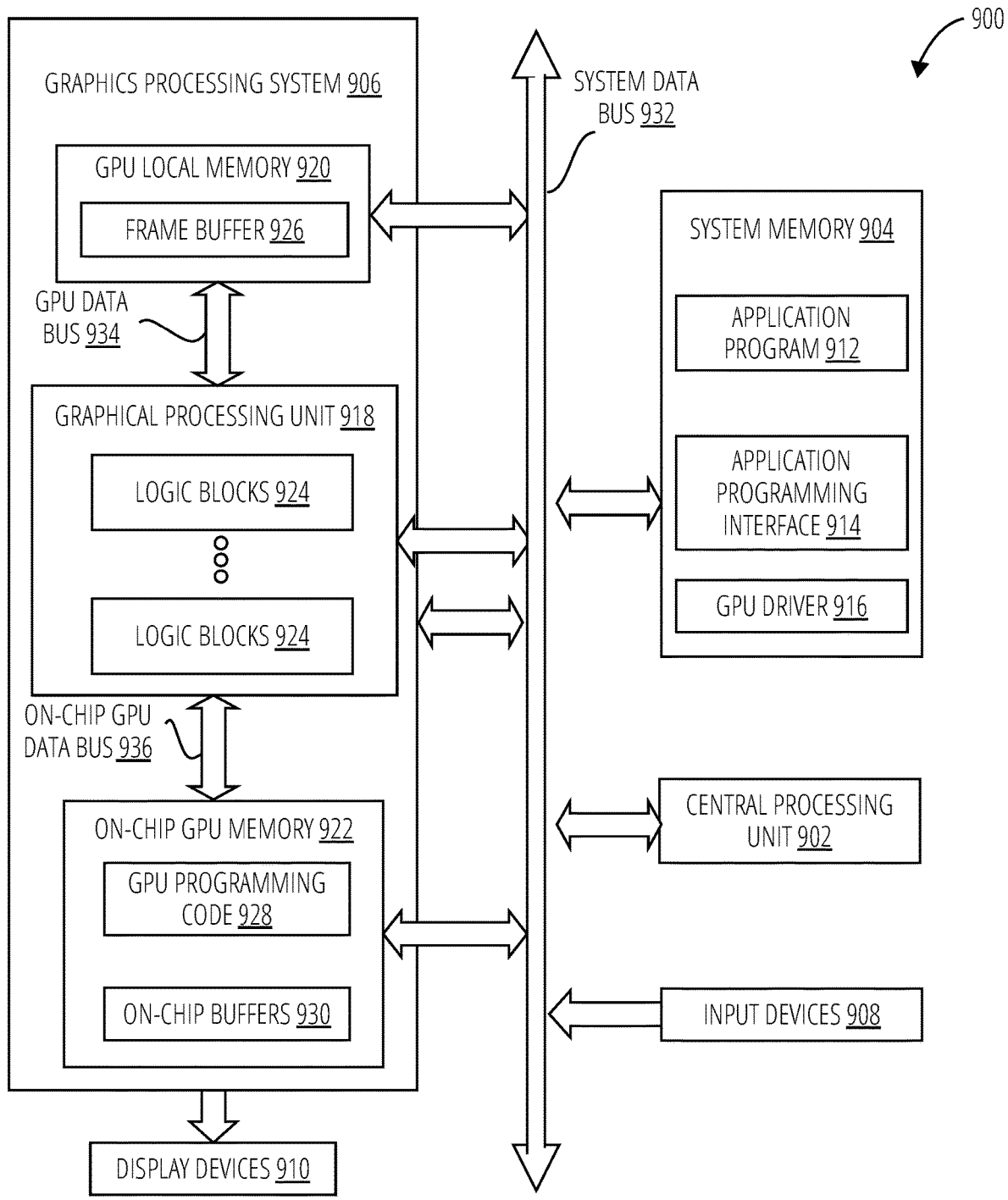
FIG. 9 is a block diagram of a computing system 900 within which the techniques introduced herein may be embodied or carried out.

FIG. 9 is a block diagram of one embodiment of a computing system 900 in which one or more aspects of the disclosure may be implemented. The computing system 900 includes a system data bus 932, a CPU 902, input devices 908, a system memory 904, a graphics processing system 906, and display devices 910. In alternate embodiments, the CPU 902, portions of the graphics processing system 906, the system data bus 932, or any combination thereof, may be integrated into a single processing unit. Further, the functionality of the graphics processing system 906 may be included in a chipset or in some other type of special purpose processing unit or co-processor.

As shown, the system data bus 932 connects the CPU 902, the input devices 908, the system memory 904, and the graphics processing system 906. In alternate embodiments, the system memory 904 may connect directly to the CPU 902. The CPU 902 receives user input from the input devices 908, executes programming instructions stored in the system memory 904, operates on data stored in the system memory 904 to perform computational tasks. The system memory 904 typically includes dynamic random access memory (DRAM) employed to store programming instructions and data. The graphics processing system 906 receives instructions transmitted by the CPU 902 and processes the instructions, for example to implement aspects of the disclosed embodiments, and/or to render and display graphics (e.g., images, tiles, video) on the display devices 910.

As also shown, the system memory 904 includes an application program 912, an API 914 (application programming interface), and a graphics processing unit driver 916 (GPU driver). The application program 912 generates calls to the API 914 to produce a desired set of computational results. For example, the application program 912 may transmit programs or functions thereof to the API 914 for processing within the graphics processing unit driver 916.

The graphics processing system 906 includes a GPU 918 (graphics processing unit), an on-chip GPU memory 922, an on-chip GPU data bus 936, a GPU local memory 920, and a GPU data bus 934. Embodiments of the systems and techniques disclosed herein may for example be utilized to communicate data on these busses and between these components. The GPU 918 is configured to communicate with the on-chip GPU memory 922 via the on-chip GPU data bus 936 and with the GPU local memory 920 via the GPU data bus 934. The GPU 918 may receive instructions transmitted by the CPU 902, process the instructions, and store results in the GPU local memory 920. Subsequently, the GPU 918 may display certain graphics stored in the GPU local memory 920 on the display devices 910.

The GPU 918 includes one or more logic blocks 924. The logic blocks 924 may implement functionality such as graphics operations, encoding techniques, artificial intelligence, matrix manipulation, and so on.

The disclosed embodiments may be utilized to communicate data between various components of the computing system 900. Exemplary component communications include between the CPU 902 and/or the GPU 918 and the memory circuits, including the system memory 904, the GPU local memory 920, and/or the on-chip GPU memory 922.

The GPU 918 may be provided with any amount of on-chip GPU memory 922 and GPU local memory 920, including none, and may employ on-chip GPU memory 922, GPU local memory 920, and system memory 904 in any combination for memory operations.

The on-chip GPU memory 922 is configured to include GPU programming 928 and on-Chip Buffers 930. The GPU programming 928 may be transmitted from the graphics processing unit driver 916 to the on-chip GPU memory 922 via the system data bus 932. The GPU programming 928 may include the logic blocks 924.

The GPU local memory 920 typically includes less expensive off-chip dynamic random access memory (DRAM) and is also employed to store data and programming employed by the GPU 918. As shown, the GPU local memory 920 includes a frame buffer 926. The frame buffer 926 may for example store data for example an image, e.g., a graphics surface, that may be employed to drive the display devices 910. The frame buffer 926 may include more than one surface so that the GPU 918 can render one surface while a second surface is employed to drive the display devices 910.

The display devices 910 are one or more output devices capable of emitting a visual image corresponding to an input data signal. For example, a display device may be built using a liquid crystal display, or any other suitable display system. The input data signals to the display devices 910 are typically generated by scanning out the contents of one or more frames of image data that is stored in the frame buffer 926.

Terms used herein should be accorded their ordinary meaning in the relevant arts, or the meaning indicated by their use in context, but if an express definition is provided, that meaning controls.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" refers to software logic embodied as processor-executable instructions stored in read-only memories or media.

"Hardware" refers to logic embodied as analog or digital circuitry.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" refers to logic implemented as processor-executable instructions in a machine memory (e.g. read/write volatile or nonvolatile memory or media).

"Bus" refers to a distinct set of conductors carrying data and control signals within a computer system, to which pieces of equipment may be connected in parallel. Each of the conductors may be referred to lines or lanes.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

The techniques disclosed herein provide uniform current consumption on wide data buses over time and scale without undue complexity to four-byte wide buses. The techniques do to require special look-up tables and do not incur additional temporal overhead (that is, running the link faster than the baseline signaling rate) or additional signal wires. The techniques are well suited for use with receiver devices that are unaware (not specially adapted for) of the encoding algorithm being used at the transmitter. All decoding information that the receiver will need to recover the data is conveyed by the polarity of the DBI bits. The technique may be applied in one or both bus directions for the link.

What is claimed is:

1. A method for encoding data communicated over a bus, the method comprising:

computing a first Hamming Distance (HD1) for a first plurality of data bits (Data1) and a first inversion bit (DBI1) (together, group 1), wherein Data1 and DBI1 are for parallel transmission over a first plurality of serial data lines of the data bus and a first data bus inversion (DBI) line of the data bus, respectively;

computing a second Hamming Distance (HD2) for a second plurality of data bits (Data2) and a second inversion bit (DBI2) (together, group 2), wherein Data2 and DBI2 are for parallel transmission with Data1 and DBI1 over a second plurality of serial data lines of the data bus and a second data bus inversion (DBI) line of the data bus, respectively;

selectively inverting one of Data1 and Data2 according to HD1 and HD2, respectively, to generate Data1' and Data2', respectively;

setting DBI1 and DBI2 according to the inversion or not of Data1 and Data2, respectively, to generate DBI1' and DBI2', respectively;

computing a third Hamming Distance (HD1') for Data1';

computing a fourth Hamming Distance (HD2') for Data2'; and selectively inverting one of Data1' and Data2' based on a comparison of HD1' and HD2'; and communicating the resulting encoded data over the data bus.

2. The method of claim 1, further comprising:
on condition that HD2'≥HD1', inverting Data2' and DBI2'.

3. The method of claim 1, further comprising:
on condition that HD2'>HD1', inverting Data2' and DBI2'.

4. The method of claim 1, further comprising:
on condition that HD1'>HD2', inverting Data1' and DBI1'.

5. The method of claim 1, further comprising:
on condition that HD1'≥HD2', inverting Data1' and DBI1'.

6. A method for encoding data communicated over a bus, the method comprising:

computing a first Hamming Distance (HD1) for a group 1 comprising a first plurality of data bits (Data1) and an inversion bit (DBI1) for Data1 and a second plurality of data bits (Data2) and an inversion bit (DBI2) for Data2;

computing a second Hamming Distance (HD2) for a group 2 comprising a third plurality of data bits (Data3) and an inversion bit (DBI3) for Data3 and a fourth plurality of data bits (Data4) and an inversion bit (DBI4) for Data4;

computing a third Hamming Distance (HD3) for a group 3 comprising a fifth plurality of data bits (Data5) and an inversion bit (DBI5) for Data5 and a sixth plurality of data bits (Data6) and an inversion bit (DBI6) for Data6;

computing a fourth Hamming Distance (HD4) for a group 4 comprising a seventh plurality of data bits (Data7) and an inversion bit (DBI7) for Data7 and an eighth plurality of data bits (Data8) and an inversion bit (DBI8) for Data8;

wherein group 1, group 2, group 3, and group 4 are for parallel transmission over a plurality of serial data lines and a plurality of data bus inversion (DBI) lines of the data bus;

selectively inverting group 1 or group 2 according to a comparison of HD1 and HD2 to generate group 1' and group 2', respectively;

selectively inverting group 3 or group 4 according to a comparison of HD3 and HD4 to generate group 3' and group 4', respectively;

forming a first combined Hamming Distance (HDC1) comprising HD1+HD2;

forming a second combined Hamming Distance (HDC2) comprising HD3+HD4;

conditionally inverting either group 3 and group 4 or group 1 and group 2 based on a comparison of the first Hamming Distance and the second Hamming Distance; and communicating the resulting encoded data over the data bus.

7. The method of claim 6, wherein conditionally inverting either group 3 and group 4 or group 1 and group 2 based on a comparison of the first Hamming Distance and the second Hamming Distance comprises:
   on condition that HDC1<=HDC2, invert group 3 and group 4; and
   on condition that HDC1>HDC2, invert group 1 and group 2.

8. The method of claim 6, wherein conditionally inverting either group 3 and group 4 or group 1 and group 2 based on a comparison of the first Hamming Distance and the second Hamming Distance comprises:
   on condition that HDC1<HDC2, invert group 3 and group 4; and
   on condition that HDC1>=HDC2, invert group 1 and group 2.

9. A method for encoding data communicated over a bus, the method comprising:
   partitioning the bus into a plurality of groups of lines, each group of lines comprising a plurality of data lines and a DBI line;
   organizing the groups into first pairs, each first pair comprising two of the groups;
   calculating a first Hamming Distance for data bits and a DBI bit (together, Data1) of each group of each first pair;
   conditionally inverting Data1 of select groups of the first pairs based on the first Hamming Distances, to form a first encoding;
   organizing the first encoding into second pairs, each of the second pairs comprising two first pairs;
   calculating a second Hamming Distance for data bits and DBI bits (together, Data2) of each first pair of each second pair;
   conditionally inverting Data2 of select first pairs of each second pair based on the second Hamming Distances, to form a second encoding;
   organizing the second encoding into third pairs, each of the third pairs comprising two second pairs;
   calculating a third Hamming Distance for data bits and DBI bits (collectively, Data3) of each second pair of each third pair;
   conditionally inverting Data3 of select second pairs of the third pairs based on a comparison of the third Hamming Distances; and
   communicating the resulting encoded bits over the bus.

10. The method of claim 9 wherein:
   conditionally inverting Data1 of select groups of the first pairs comprises inverting Data1 for one group of each first pair based on the first Hamming Distances;
   conditionally inverting Data2 of select first pairs of each second pair comprises inverting Data2 for one pair of each second pair based on the second Hamming Distances.

11. The method of claim 10, wherein:
   conditionally inverting Data3 of select second pairs of the third pairs comprises inverting Data3 for one second pair of each third pair based on the third Hamming Distances.

* * * * *